(12) United States Patent
Hashimura et al.

(10) Patent No.: US 6,494,543 B1
(45) Date of Patent: Dec. 17, 2002

(54) PNEUMATIC TIRE AND PNEUMATIC TIRE-RIM ASSEMBLY

(75) Inventors: Yoshiaki Hashimura, Hiratsuka (JP); Daisuke Kanenari, Hiratsuka (JP)

(73) Assignee: The Yokohama Rubber Co., Ltd., Tokyo ( * ) Notice: Subject to any disclaimer, the term of this patent is extended or adjusted under 35 U.S.C. 154(b) by 0 days.

(21) Appl. No.: 09/353,150

(22) Filed: Jul. 14, 1999

(30) Foreign Application Priority Data

Jul. 14, 1998 (JP) .......................................... 10-198634

(51) Int. Cl.⁷ ................................................ B60B 21/00
(52) U.S. Cl. .................................................. 301/95.101
(58) Field of Search ............................. 301/95, 1, 5.1; 152/203, 510, 154.2, DIG. 12

(56) References Cited

U.S. PATENT DOCUMENTS

| | | | |
|---|---|---|---|
| 1,544,262 A | * | 6/1925 | Midgely |
| 1,784,118 A | * | 12/1930 | Smithers |
| 2,742,942 A | * | 4/1956 | Owen |
| 2,985,216 A | * | 5/1961 | Williams et al. |
| 3,398,776 A | * | 8/1968 | Reinbold |
| 4,131,149 A | * | 12/1978 | Roberts, Jr. |
| 4,256,159 A | * | 3/1981 | Williams |
| 6,079,789 A | * | 6/2000 | Cunningham ................ 301/95 |

* cited by examiner

*Primary Examiner*—Russell D. Stormer
(74) *Attorney, Agent, or Firm*—Rader, Fishman & Grauer, PLLC

(57) ABSTRACT

In a pneumatic tire according to the present invention, at least a portion for an inner surface of a tire is pigmented with a fluorescent material, with a chromatic color of specified lightness and saturation or with an achromatic color at V=10. Further, in a tire-rim assembly according to the present invention, at least a portion for an inner surface of a tire is pigmented with a fluorescent material, with a chromatic color of specified lightness and saturation or with an achromatic color at V=10 as the discriminating information for rim assembly, and at least a portion for the surface of a rim assembled with the tire is pigmented with a color related to the color pigmenting the tire.

10 Claims, 3 Drawing Sheets

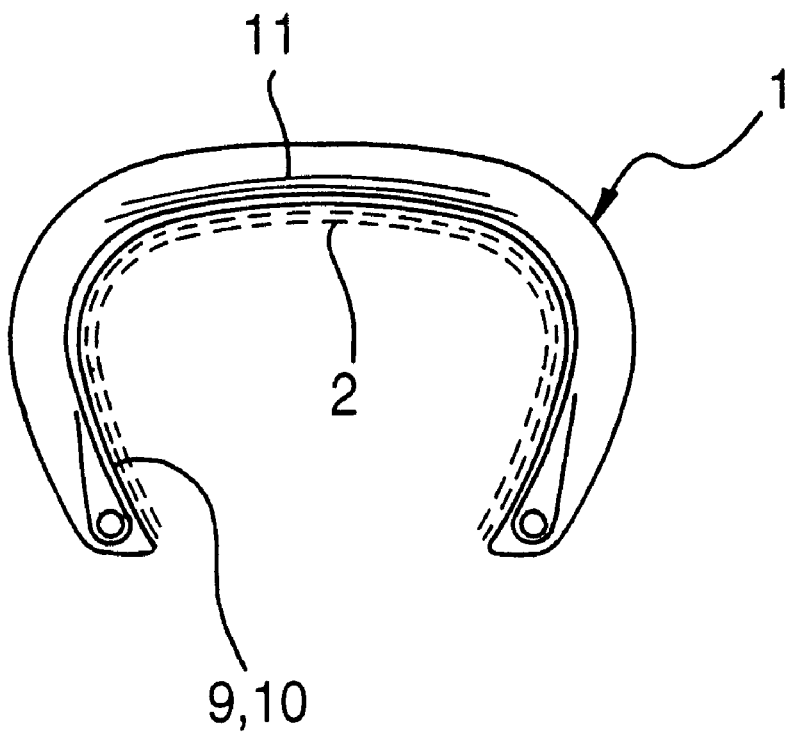

PNEUMATIC TIRE AND PNEUMATIC TIRE-RIM ASSEMBLY

BACKGROUND OF THE INVENTION

The present invention concerns a pneumatic tire in which an inner surface of a tire is pigmented by bright and clear colors so as to indicate various information and facilitate discrimination for injured portions upon puncture, as well as a pneumatic tire-rim assembly capable of preventing erroneous mounting between a tire and a rim upon rim assembling.

Conventionally, it has been of practice to ascertain information on such as the prescribed combination of a tire and a rim to be assembled together, an obverse or a reverse side of the tire and the predetermined rotational direction of the tire with reference to letters or numerals impressed to a side wall portion of the tire. However, since the impression is small in size and merely comprises a series of letters or numerals, it often gives rise to the problem of causing erroneous reading or discrimination. Therefore, inconveniently an erroneous mounting is likely at the times of tire-rim assembling such that a tire is assembled to an unsuited rim or a tire having a directional tread pattern is assembled to a rim not in agreement with the directionality of the tire.

SUMMARY OF THE INVENTION

An object of the present invention is to provide a pneumatic tire of providing various information to the inner surface of a tire by bright and clear pigmentation, thereby preventing erroneous use, facilitating confirmation for injured portions and also facilitating classification upon recyclic use.

Another object of the present invention is to provide a pneumatic tire-rim assembly capable of preventing erroneous mounting of a tire and a rim upon rim assembling by pigmenting both of the inner surface of the tire and the rim in bright and clear colors.

According to the pneumatic tire of the present invention, at least a portion for the inner surface of a tire is pigmented with a fluorescent material, or at least one chromatic color in a relation for lightness V and saturation C of: $V+C \geqq 5$ and at $V=1$ to 9.5, $C=1$ or greater according to JIS Z 8721-1977 or an achromatic color at $V=10$.

As described above, since the inner surface of a tire is pigmented brightly and clearly by a fluorescent material, a chromatic color at specified lightness and saturation, or by an achromatic color at $V=10$, meaning of the pigmentation can be recognized simply and easily by merely viewing the pigmentation visually, so that various information can be obtained easily.

In addition, since the inner surface of the tire is thus pigmented, even if a nail has been removed after puncture caused by treading the nail, a black rubber at the inner layer is exposed to the inner surface of the bright and clear color through the hole left after pulling out the nail, injured portion can be distinguished easily.

In a pneumatic tire-rim assembly according to the present invention, at least a portion on the surface of a rim is pigmented by a fluorescent material, a chromatic color of specified lightness and saturation or an achromatic color at $V=10$, and at least a portion for the inner surface of the tire is also pigmented with a color related with the color pigmenting the rim.

As described above, since the surface of the rim and the inner surface of the tire are pigmented by colors related to each other, adequacy for the combination of the tire and the rim can be visually recognized simply and easily by merely pigmenting the inner surface of the tire and pigmenting the surface of the rim, so that it is possible to prevent erroneous mounting between the tire and the rim upon rim assembling.

BRIEF DESCRIPTION OF THE DRAWINGS

FIG. 8 is an explanatory view illustrating another model of a median cross section of a tire according to the present invention.

DESCRIPTION OF THE PREFERRED EMBODIMENTS

Figure 1:
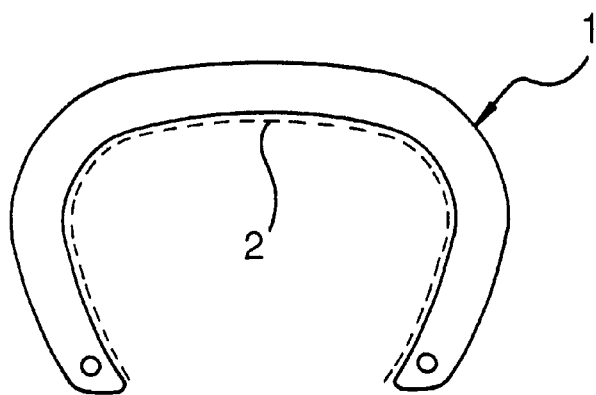
FIG. 1 is an explanatory view illustrating a model of a meridian cross section of a tire according to the present invention.

In a pneumatic tire according to the present invention shown in FIG. 1, pigmentation 2 is applied over the entire inner surface of a tire 1 with a fluorescent material, a chromatic color or an achromatic color (in FIG. 1, the pigmentation 2 is applied over the entire inner surface of the tire 1, but the pigmentation 2 may be applied to at least a portion of the inner surface). Explanations for inner structures of the tire related to arrangement such as of a carcass layer and a belt layer in the inside of the tire are omitted.

The fluorescent material may be a fluorescent pigment or a fluorescent dye comprising an organic or inorganic fluorescent material as an ingredient.

The inorganic fluorescent pigment is prepared, for example, from oxides, sulfides, silicates, tungstate and chlorates of metals such as zinc, cadmium, calcium, aluminum or yttrium at high purity as the main ingredient by adding a slight amount of an activating agent such as manganese, silver, copper, lead and europium, and a flux and sintering them at a high temperature.

The metal sulfides can include, for example, CaS and ZnS, metal oxides can include, for example, ZnO, $Y_2O_3$ and metal chlorates can include, for example, $CaWO_4$, $MgWO_4$, $Zn_2SiO_4$ and $BaSi_2O_5$.

The fluorescent material used in the present invention is preferably a light accumulating material. The light accumulating fluorescent material can include, for example, zinc sulfide-based fluorescent materials (ZnS:Cu; ZnS:Cu, Co; CaS:Eu, Tm; and CaS:Bi), and alkaline earth aluminate-based fluorescent materials ($SrAl_2O_4$: Eu; $Al_2O_4$: Eu, Dy; $Sr_4Al_{14}O_{25}$: Eu, Dy; $CaAl_2O_4$: Eu, Nd). Among them, alkaline earth aluminate-based fluorescent materials are more preferred, in view of excellent emission luminance and afterglow time. They may be used alone or as a mixture of two or more of them.

The chromatic color includes, for example, red, yellow-red, yellow, yellow-green, green, blue-green, blue, blue-purple, purple and red-purple, and those in a relation for lightness V and saturation C of: $V+C \geq 5$ according to JIS Z 8721-1977, and at V=1 to 9.5, C=1 or greater. If the lightness V and the saturation C are out of the range described above, no bright and clear pigmentation 2 can be obtained. That is, even if a chromatic color is used, since pigmentation with a dark color is less conspicuous, effect such as prevention of erroneous mounting is deteriorated. Further, in a case of confirming an injured position on the inner surface of a tire upon conducting puncture repair of the tire, if the injury of the puncture is caused by treading a nail or the like, when the inner surface of the tire is pigmented with a dark chromatic color, a portion of a black rubber at the inside of the tire exposed to the inner surface of the tire by the injury is similar to the color at the periphery, so that it results in a problem that the injured portion can not be recognized easily.

Further, colors in a relation for the lightness V and the saturation C of : $V+C \geq 7$ and V=1 to 9.5, C=1 or greater are preferred since the they are brighter and clearer. At least one color may be used for the chromatic color.

The achromatic color is at V=10. In the present invention, pigmentation may be applied either with the achromatic color or with the chromatic color described above.

The color for the pigmentation 2 may be corresponded also to the kind of the rim to which the tire is assembled. The pigmentation 2 may be a mono-color or a combination of a plurality of colors. In a combination of a plurality of colors, a fluorescent material may be combined with a chromatic color. The pigmentation may also be applied partially to an appropriate portion on the inner surface of the tire (for example, it may be pigmented in a ribbon-like shape at the crown part of the inner surface). Further, letters or patterns may also be added, as required, together with application of the pigmentation 2.

The area to be pigmented is preferably as large as possible so as to facilitate discrimination from usual builder marks. It is preferably 2 cm×1 cm or more and, further preferably, it is 0.01% or more for the inner surface area of the tire. It is preferred to pigment the substantially entire tire surface.

The thickness for the pigmentation 2 (thickness for the pigmented layer) is preferably from 0.05 mm to 1.0 mm. This is because it suffers from the effect of color of an underlying portion if the thickness of the pigmented layer is less than 0.05 mm, whereas the tire becomes heavy if the thickness is larger than 1.0 mm.

It is preferred that a layer having lightness V plus saturation C according to JIS Z 8721-1977 of 5 or more is interposed between the pigmentation color layer (pigmentation 2) and a black rubber layer (underlying layer) adjacent thereto by at least one layer ($V+C \geq 5$). If V+C for the layer is less than 5, the pigmented layer undergoes the effect of the underlying color. Further, a barrier layer containing a polymer of high polarity for preventing discoloration of the pigmented layer caused by migration of compounding agents from the black rubber layer, that is, having a Solubility Parameter of $18^{J1/2}/cm^{3/2}$ may be disposed at least by one layer between the pigmentation layer and the black rubber layer adjacent therewith. Preferred polymer can include, for example, chlorosulfonated polyethylene, epichlorohydrin rubber, polysulfide rubber, chlorinated rubber, acryl rubber, acrylonitrile butadiene rubber with acryl content of 25% or more and urethane rubber. Further preferably, if the layer has a thickness of 0.3 mm or more, it can provide a great barrier effect against migration of the compounding agents.

Further, it is preferred to dispose the pigmentation 2 in a region at least corresponding to the belt layer 11 in the inner surface of the tire. This is because injury of puncture caused by treading a nail or the like tends to be caused in this region and this can provide a further effect of easily discriminating the injury.

At least a portion for the inner surface of the tire may be pigmented with at least one chromatic color in a relation for lightness V and saturation C of: $V+C \geq 5$ and at V=1 to 9.5, C=1 or greater according to JIS Z 8721-1977 or an achromatic color at V=10, while at least a portion for the inner surface of the tire may also be pigmented with a fluorescent material.

Further, it is preferred that at least a portion for the inner surface of a tire is pigmented with two or more colors and, in which at least two colors of them are additive complementary colors or colors adjacent with the additive complementary colors and in a substantially. complementary relation in a hue circle of 10 hues according to JIS Z 8721-1977 or in a relation with respect to the difference of lightness V+saturation C of 5 or more. The additive complementary colors or colors adjacent with the additive complementary colors and in a substantially complementary relation in the hue circle of 10 hues include those cases where pigmentation is applied, for example, by two colors, one of the two colors is red including an intermediate color such as pink or scarlet while the other of the colors situates at the opposite position in the hue circle, that is, blue green as the additive complementary color to red including intermediate colors such as light green, or blue or green including intermediate colors adjacent with blue-green as the additive complementary color to red.

It will be apparent that combination of additive complementary colors or colors adjacent with the additive complementary colors and substantially in the additive complementary relation is not restricted only to the combination of the colors described above.

Further, colors in a relation for the difference of lightness V and saturation C of 5 or more mean two colors having difference in brightness and clearness such as a combination of a bright and clear color with lightness V+saturation C at 14 and a dark color with lightness V+saturation C is 4.

Accordingly, combination of colors in this case is not restricted to an identical hue so long as the difference of the lightness V and the saturation C is 5 or greater. In addition, if the difference for lightness V+saturation C is 5 or greater, it may be a combination of a bright and clear chromatic color and a dark chromatic color, or a combination of a bright and clear chromatic color and an achromatic color, for example, black.

However, if the area for the dark chromatic color or an achromatic color such as black is increased, the nail treading portion and the portion of such dark chromatic color or achromatic color are aligned to increase the worry incapable of discriminating failed portions, so that it is desirable that the area for the portion pigmented with a dark chromatic color or achromatic color relative to the inner area of the tire is smaller than the area for the bright and clear chromatic color or it may be pigmented while avoiding the inner surface of the tire for the belt layer possibly suffering from penetration of nail.

Further, the situation is similar also in a case of a combination of pigmentation with a fluorescent material and a chromatic color or an achromatic color, in which it is preferred that the area for the pigmentation with the fluorescent material is made wider than the area of the chromatic color or the achromatic color, and it is preferred to add discriminating information by forming stripes, letters, numerals, symbols, graphics and patterns to the inner surface of the tire using at least one color containing black.

The method of applying the pigmentation 2 may be any one of [i] blending a colorant (fluorescent material, pigment, dye and the like) with a member constituting the inner surface of the tire (for example, inner resin liner), [ii] applying printing to the inner surface of a tire with a colorant, [iii] appending a pigmented sticker or the like to the inner surface of a tire, [iv] coating a paint to the inner surface of a tire, or [v] blending a colorant with a green inside paint (GIP, an inner surface releasing agent which is previously coated to the inner surface of a green tire such that the green tire and the bladder are not adhered during vulcanization molding).

Referring specifically to a method of disposing a light accumulating fluorescent material to the inner surface of the tire, it can be applied, for example, by mixing and homogeneously dispersing a finely pulverized light accumulating pigment into a rubber, a thermoplastic resin, a thermoplastic elastomer, a thermosetting resin and the like, molding the same into the form of a sheet or film and appending the same to the inner surface of the tire before or after vulcanization, or it may be dissolved in an appropriate solvent and coated. The substrate material, preferably, has an appropriate flexibility and excellent permeability to light, particularly, UV-rays, by which the performance of the light accumulating material can be provided fully. The substrate may be blended with the light accumulating fluorescent material, as well as crosslinkers, crosslinking aids, plasticizers, adhesives, fillers, antioxidants, colorants, stabilizers, tackifiers and bonding agents within such a range as not deteriorating the light emitting performance of the light accumulating fluorescent material. When the light accumulating fluorescent material is disposed to the inner surface of the tire, since the underlying tire itself is black and has no light reflectivity, the performance of the light accumulating fluorescent material can be provided more effectively if colors of high lightness such as white, silver, yellow and yellow-green are used for the underlying layer.

The discriminating information to be contained in the pigmentation 2 can include (a) tire size such as nominal section width of tire, nominal aspect ratio and rim diameter code, (b) speed range, (c) load range, (d) obverse and reverse of tire, (e) tire rotational direction, (f) allowable rim width, (g) tire performance, (h) air retainability (in temporary use tire, etc.), (i) material used (kind of cords such as belt layer, carcass layer, etc.), (j) compatible tire size, (k) information for use such as adaptable vehicles, (l) information for the specification of tire structure, (m) information for recycle use and (n) information for destination.

The discriminating information is applied specifically, for example, such that the color is changed on every rim diameter to prevent erroneous mounting, or pigmentation is given in red for racing tire, blue for high performance tire for ordinary road, green for general purpose tire and white for temporary use tire for indication of the tire performance, so that users can select tires of desired performance easily on shops. Further, for the air retainability, white is applied to a spare tire for preventing erroneous use. For the tire material, red is used for the presence and white is used for the absence of steel core, and yellow is used for the tire capable of regeneration of tread intending for man-power saving in the classification operation in recyclic use. Builders' marks, bar codes and the like may be disposed to the inner surface of the tire as usual, for which information may be as usual.

Figure 2:
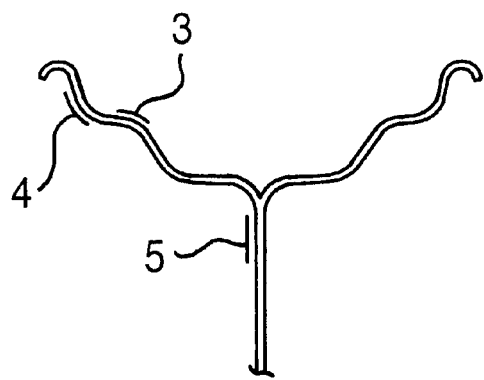
FIG. 2 is an explanatory view illustrating a meridian cross section of a rim to which a tire according to the present invention is assembled.

Further, in the present invention, the inner surface of the tire is pigmented as described above and at least a portion for the surface of a rim to be assembled with the tire is also pigmented with a color related to the color pigmenting the inner surface of the tire (in other words, at least a portion for the surface of the rim is pigmented and the inner surface of the tire is also pigmented with a color related to the color pigmenting the rim). That is, as shown in FIG. 2, pigmentation is applied to at least one position such as pigmentation 3 near the bead seat, pigmentation 4 near the rim flange and pigmentation 5 for the disc portion near the rim bottom. It is preferred to pigment at least a portion between rim flanges which is a portion to be concealed when the surface of the rim is combined with the tire.

The color related to the color pigmented to the inner surface of the tire is a color representing a rim adaptable for the assembling of the tire and the color is previously determined. For example, the color pigmented to the inner surface of the tire is made identical with the color pigmented to the rim, or red is pigmented to the inner surface of the tire while blue is pigmented to the rim, and the rim pigmented blue is considered as a rim adaptable to the tire. It is preferable that at least one color identical with each other is contained for the colors pigmented to the inner surface of the tire and the colors pigmented to the rim.

Furthermore, it is preferred to display information describing the relation between the pigmentation applied to the rim and pigmentation applied to the inner surface of the tire, for example, by a package or label to both of the tire and the rim.

Then, FIG. 3 to FIG. 7 show various embodiments of the present invention.

Figure 3:
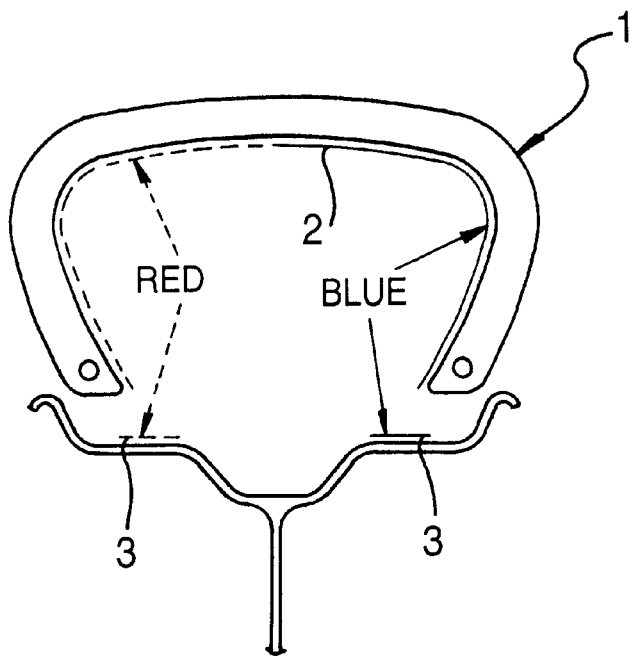
FIG. 3 is an explanatory view illustrating a meridian cross section of a tire-rim assembly showing a model of a preferred embodiment according to the present invention.

FIG. 3 shows a symmetric tire in which tread patterns formed on a tread surface are different between right and left on both sides of a tire equator in which the color for pigmentation 2 on the inner surface of a tire 1 is colored red at the left to the tire equator (on the obverse side when mounted to a wheel) and colored blue at the right to the tire equator (on the reverse side when mounted to the wheel) and, correspondingly, a pigmentation 3 near the bead seat for the rim is colored red on the left and blue on the right. That is, the color is changed between the obverse and the reverse of the tire and, correspondingly, the color is changed between the obverse and the reverse of the rim.

Figure 4:
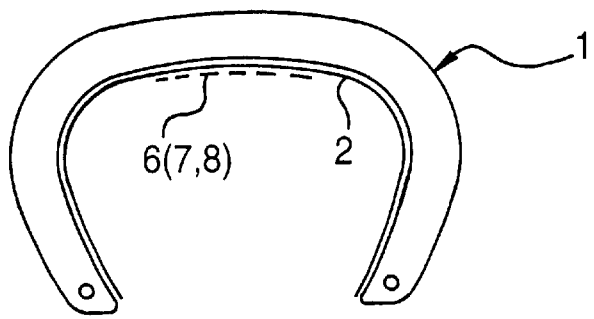
FIG. 4 is an explanatory view illustrating another model of a median cross section of a tire according to the present invention.
Figure 5:
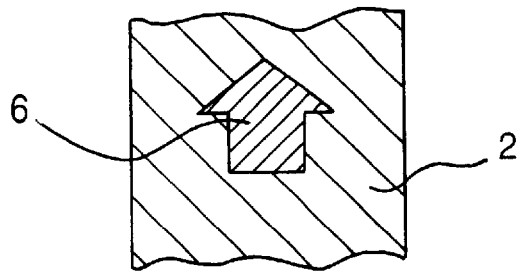
FIG. 5 is a planer explanatory view illustrating an example for a portion of an inner surface of a tire corresponding to the tire shown in FIG. 4.
Figure 6:
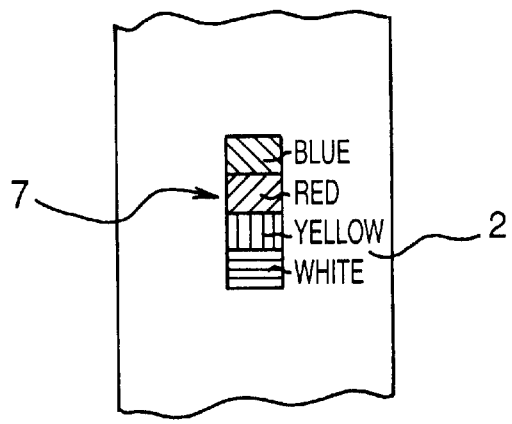
FIG. 6 is an explanatory planer view illustrating another example for a portion of an inner surface of the tire corresponding to the tire shown in FIG. 4.
Figure 7:
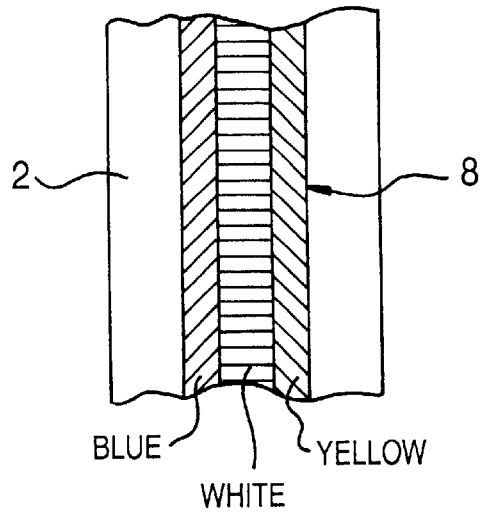
FIG. 7 is an explanatory planer view illustrating a further example for a portion of an inner surface of the tire corresponding to the tire shown in FIG. 4.

In FIG. 4, a pigmentation 2 is applied in a crown part at the inner surface of a tire 1 for entire circumference of the tire, in which an arrow 6 indicating the rotational direction of the tire is applied on the pigmentation 2 by a color different from that in the pigmentation 2 as shown in FIG. 5. Further, as shown in FIG. 6, a pattern 7 formed by arranging a plurality of different colors such as blue, red, yellow and green each as a block on the pigmentation 2 in the tire circumferential direction as shown in FIG. 6 may be disposed partially. Alternatively, as shown in FIG. 7, a pattern 8 formed by arranging a plurality of different colors such as blue, green and yellow each as a stripe in the lateral direction of the tire width which may be disposed over an entire circumference of the tire 1. When the arrows 6, the pattern 7 or the pattern 8 described above is disposed, the pigmentation 2 applied on the inner surface of the tire in FIG. 4 may be omitted.

In a case of indicating the information by the arrangement of colors as shown in FIG. 6, the pigmented area for the pattern 7 is preferably 2 cm×1 cm or more in order to clearly discriminate from the builder mark and, in a case of color stripes as shown in FIG. 7, the pigmented area for the pattern 8 is preferably 0.01% or more for the inner surface area of the tire.

As shown in FIG. 8, the pigmentation 2 includes two pigmented layers 9 and 10. Although not by way of limitation, the pigmented layer 9 has a lightness V plus saturation C according to JIS Z 8721-1977 of 5 or greater and is interposed between the pigmented layer 10 on the intersurface of the tire and a black rubber layer adjacent therewith. Also, a barrier layer 11 is interposed between the pigmentation 2 on the inner surface of the tire and the black rubber tire using at least one color thereby adding discriminating information.

EXAMPLE (1) A tire having a pigmented film on the inner surface was manufactured by the following manner (corresponding to pigmentation for the tire inner surface).

Preparation of Colored Film

A blend of the blending content (parts by weight) shown in Table 1 was kneaded under the condition at a temperature of 220° C. by using a twin screw extruder, and cooled with water to prepare a master batch A. Br-IPMS means a brominated isobutylene-p-methyl styrene.

Then, the master batch A, nylon 6 and a color master (green, yellow) were blended according to the blending ratio (parts by weight) shown in Table 2, which was extruded through a T-die to prepare a film of 100 μm thickness. The Young's modulus and the air permeation efficient of the film are as shown in Table 2.

Preparation of Tire

The film described above was wound around a tire forming drum, on which tire members such as a carcass layer, two side treads, a belt layer and a tread were laminated and inflated to prepare a green tire. The green tire was vulcanized at 180° C. for 10 min. to manufacture a tire.

TABLE 1

Master Batch A

| Material Name | Product Name | Manufacturer | Blending amount |
|---|---|---|---|
| Br-IPMS | EXXPRO89-4 | Exxon Chemical | 70 |
| Nylon 11 | BESN 0 TL | Atochem | 30 |
| CuI | Regent | Wako Pure Chemical Industries, Ltd. | 0.02 |
| ZnO | Zinc powder No.3 | Seido Chemical Industry Co., Ltd. | 0.35 |
| Stearic acid | Stearic acid NY | NOF Corp. | 1.4 |
| Zinc Stearate | Zinc stearate | Seido Chemical Industry Co., Ltd. | 0.7 |

TABLE 2

Example 1, 2 Blend and Physical Property

| | Material Name | Product Name | Manufacturer | Example 1 | Example 2 |
|---|---|---|---|---|---|
| Blend | Mater batch A | | | 80 | 80 |
| | Nylon 6 | Amilan CM 1041 | Toray Industries, Inc. | 10 | 10 |
| | Color Master (1) | PAM(F) 167(D) | Dainichiseika Colour & Chemicals Mfg. Co., Ltd. | 10 | |
| | Color Master (2) | PAM(F) 104(d) | Dainichiseika Colour & Chemicals Mfg. Co., Ltd. | | 10 |
| Air permeation coefficient × $10^{-12}$ (cc · cm/cm$^2$ · sec · cmHg) | | | | 12 | 13 |
| Young's modulus (MPa) | | | | 100 | 105 |

When the color master is related with the tire rotational direction, the tire rotating direction can be recognized easily upon mounting the tire to a vehicle.

(2) Further, the color for the inner surface of the tire and the feasibility for the discrimination of failed portions such as puncture were evaluated by the following method and the result is shown in Table 5.

Tire Size: 185/65R14

Comparative Example 1

Existent tire with a black inner surface not particularly pigmented for the inner surface (lightness V=2, saturation C=0)

Example 3

Tire applied with pigmentation by a chromatic color of V+C=5 substantially for the entire inner surface (lightness V=4, saturation C=1)

Example 4

Tire in which a pigmented film of Example 1 is appended substantially for the entire inner surface (lightness V=6, saturation C=6)

Example 5

Tire applied with pigmentation by a light accumulating fluorescent material substantially for the entire inner surface (light accumulating fluorescent layer is disposed substantially for the entire inner surface)

The tire in Example 5 was manufactured as described below.

Tire in Example 5

A rubber composition comprising 100 parts by weight of a ethylene—propylene copolymer rubber (EPDM) and, blended therewith, 25 parts by weight of a strontium aluminate fluorescent material ($SrAl_2O_4$: Eu, Dy) (blend ratio is shown in Table 3) was molded by a roll into 1 mm thick sheet-like product to obtain a sheet. On the other hand, an underlying rubber layer of 0.5 mm thick comprising 50 parts by weight of a ethylene—propylene copolymer rubber (EPDM) and 50 parts by weight of a halogenated butyl rubber, 100 parts by weight in total and, blended therewith, 15 parts by weight of titanium dioxide (blending: Table 4) was molded. The, the sheet described above was appended with the underlying rubber layer and wound around a drum such that the underlying rubber layer situated outside in the diametrical direction of the drum and then an inner liner layer and a carcass layer were wound in this order around the drum. Beads were are spiked from both sides of the drum to turn-up the layers at the periphery of the beads, then the side rubber was appended and, successively, the belt layer and the tread were appended to form a green tire. The green tire was vulcanized in a vulcanizing machine at 180° C. for 10 min to manufacture a tire such that the light accumulating fluorescent layer was disposed substantially over the entire tire inner surface.

TABLE 3

Blend of Light Accumulating Fluorescent Layer

| | |
|---|---|
| EPDM (ESPRENE 505A: manufactured by Sumitomo Chemical Co., Ltd.) | 100 parts by weight |
| Fluorescent material (N Yako (trade name: LumiNova): manufactured by Nemoto & Co., Ltd.) | 25 parts by weight |
| Clay (SUPREX CLAY: manufactured by HUBER) | 20 parts by weight |
| Zinc oxide (Zinc powder #1: manufactured by Seido Chemical Industry Co., Ltd.) | 5 parts by weight |
| Stearic acid (Stearic acid: manufactured by Kao Corp.) | 0.5 parts by weight |
| Antioxidant (ANTAGE W-400: manufactured by Kawaguchi Chemical Industry Co., Ltd.) | 1 part by weight |
| Crosslinker (PERCADOX 14/40: manufactured by Kayaku Akuzo Corporation) | 5 parts by weight |
| Co-agent (ACRYESTER TMP: manufactured by Mitsubishi Rayon Co., Ltd.) | 2 parts by weight |

TABLE 4

Blending of Underlying Layer

| | |
|---|---|
| EPDM (ESPRENE 505A: manufactured by Sumitomo Chemical Co., Ltd.) | 50 parts by weight |
| Br-IIR (Exxon Bromobutyl 2255: manufactured by Japan Butyl Co., Ltd.) | 50 parts by weight |
| Titanium dioxide (A-100: manufactured by Ishihara Sangyo Kaisha, Ltd.) | 15 parts by weight |
| Clay (SUPREX CLAY: manufactured by HUBER) | 40 parts by weight |
| Zinc powder (Zinc powder #1: manufactured by Seido Chemical Industry Co., Ltd.) | 4 parts by weight |
| Stearic acid (Stearic acid: manufactured by Kao Corp.) | 1 part by weight |
| Antioxidant (ANTAGE W-400: manufactured by Kawaguchi Chemical Industry Co., Ltd.) | 1 part by weight |
| Sulfur (SUNFEL: manufactured by Sanshin Chemical Industry Co., Ltd.) | 1 part by weight |
| Accelerator (NOXCELLER CZ-G: manufactured by Ouchi-Shinko Chemical Industry Co., Ltd.) | 1.2 parts by weight |

Evaluation Method

Measuring Method for Lightness and Saturation Standard color chips specified in JIS Z 8721-1977 "Specification of Colours According to their three Attributes" was used and determined according to "method of determination for direct comparison with standard color chips" as defined in para. 6 of the standards (fluorescent material is not included therein).

Method of Measuring Feasibility for the Discrimination of Failed Portion (Average Number for Correct Answer)

An awl having a diameter of 1.2 mm at the largest was penetrated from the outside of the tire at 10 optional positions in the belt lower portion of each tire, which was measured by five persons of normal color sense as to how many positions for holes they could discriminate under sufficiently bright natural light while avoiding direct sunlight during daytime of a fine day, after three hours of sunrise and after three hours of sunset, and the results were compared by average. Accordingly, a larger value shows more feasibility for the discrimination of failed positions (daytime in fine weather is described as a substitute for light used for illumination in "method of comparison for surface color" in JIS Z 8723.

TABLE 5

| | Comparative Example 1 | Example 3 | Example 4 | Example 5 |
|---|---|---|---|---|
| | Black (V = 2) | V + C = 5 | V + C = 12 | Pigmentation by fluorescent material |
| Average number of correct answer | 4 | 10 | 10 | 10 |

As shown in Comparative Example 1, if the color for the underlying portion is black as usual, since a punctured portion through which rubber is slightly exposed to the inner surface can not be distinguished from the black underlying portion, discrimination for failure is difficult.

Further, if the inner surface is pigmented with a chromatic color at the sum of the lightness V and the saturation C of 5 or more, or pigmented with a fluorescent material, even a fine hole can be discriminated easily.

As has been described above, according to the present invention, since at least a portion for the inner surface of the tire is pigmented with fluorescent material, with a chromatic color of specific lightness and saturation or with an achromatic color at V=10, or since at least a portion for the surface of an adaptable rim to be assembled with the tire is also pigmented with a color related to a color pigmented to the tire in addition to the pigmentation for the tire, the following effects (i)–(v) can be provided.

(i) Information required upon assembling the rim can be discriminated easily and simply with no error.

(ii) Since it may suffice to merely combine a tire pigmented at the inner surface and a rim pigmented to a color related to the color for the pigmentation of the tire, erroneous mounting can be prevented.

(iii) Pigmentation for the inner surface of the tire in accordance with the purpose of use such as for racing use and emergency use can prevent erroneous use of tires.

(iv) Classification by color for the kind of the material used in the inside of the tire (for example, belt layer, carcass layer) can facilitate classifying operation upon recycle use.

(v) Failed portion such as aperturing can easily be found upon shipping inspection in a factory, and failed portions on the surface of a tire such as puncture can easily be found.

What is claimed is:

1. A pneumatic tire in which at least a portion of an inner surface of a tire is pigmented with a fluorescent material, with at least one chromatic color in a relation of lightness V and saturation C according to JIS Z 8721-1977 of: $V+C \geqq 5$ and V=1 to 9.5 and at C=1 or greater, or with an achromatic color at V=10, and wherein at least one layer having lightness V+saturation C according to JIS Z 8721-1977 of 5 or greater is interposed between the pigmented layer on the inner surface of the tire and a black rubber layer adjacent therewith.

2. A pneumatic tire as defined in claim 1, wherein the thickness of the pigmented layer on the inner surface of the tire is from 0.05 mm to 1.0 mm.

3. A pneumatic tire as defined in claim 2, wherein the fluorescent material is a light accumulating fluorescent material.

4. A pneumatic tire as defined in claim 1, wherein at least a region on the inner surface of the tire corresponding to a portion of the tire having a belt layer therein is pigmented.

5. A pneumatic tire as defined in claim 2, wherein stripes, letters, numerals, symbols, graphics and patterns are formed to the inner surface of the tire using at least one color thereby adding discriminating information.

6. A pneumatic tire as defined in claim 5, wherein information including at least one of tire size, nominal section width, nominal aspect ratio, or rim diameter code, speed range, load range, obverse and reverse of tire, tire rotational direction, allowable rim width, tire performance, air retainability, material used, compatible tire size, and name of adaptable vehicle, information for the specification of tire structure, information for the destination and information for recyclic use is provided as the discriminating information.

7. A pneumatic tire in which at least a portion of an inner surface of a tire is pigmented with a fluorescent material, with at least one chromatic color in a relation of lightness V and saturation C according to JIS Z 8721-1977 of: $V+C \geq 5$ and V=1 to 9.5 and at C=1 or greater, or with an achromatic color at V=10, and wherein at least one barrier layer containing a polymer having an Solubility Parameter ($18^{J1/2}/cm^{3/2}$) or more is interposed between the pigmentation layer on the inner surface of the tire and a black rubber tire using at least one color thereby adding discriminating information.

8. A pneumatic tire as defined in claim 7, wherein at least a portion for the inner surface of the tire is pigmented with two or more colors, in which at least two colors thereof are additive complementary colors, colors adjacent with additive complementary colors in a hue circle for 10 hues according to JIS Z 8721-1977 or in a relation for the difference of lightness V+saturation C of 5 or greater.

9. A pneumatic tire-rim assembly in which at least portion of the surface of a rim is pigmented and the inner surface of a tire is also pigmented with a color related to a color pigmenting the rim, by a fluorescent material, a chromatic color in a relation of lightness V and saturation C according to JIS Z 8721-1977 of $V+C \geq 5$ and at V=1 to 9.5, C=1 or greater, or an achromatic color at V=10, wherein at least one barrier layer containing a polymer having an Solubility Parameter ($18^{J1/2}/cm^{3/2}$) or more is interposed between the pigmentation layer on the inner surface of the tire and a black rubber tire using at least one color thereby adding discriminating information.

10. A pneumatic tire-rim assembly in which at least a portion of a surface of a rim is pigmented and an inner surface of a tire is also pigmented with a color related to a color pigmenting the rim, by a fluorescent material, with at least one chromatic color in a relation of lightness V and saturation C according to JIS Z 8721-1977 of: $V+C \geq 5$ and V=1 to 9.5 and at C=1 or greater, or with an achromatic color at V=10, and wherein at least one layer having lightness V+saturation C according to JIS Z 8721-1977 of 5 or greater is interposed between the pigmented layer on the inner surface of the tire and a black rubber layer adjacent therewith.

* * * * *